Patented Oct. 15, 1946

2,409,293

UNITED STATES PATENT OFFICE 2,409,293

HORMONE INTERMEDIATES AND PREPARATION OF SAME

Russell Earl Marker, Mexico City, Mexico, assignor to Parke, Davis & Company, Detroit, Mich., a corporation of Michigan No Drawing. Original application June 30, 1941, Serial No. 400,559. Divided and this application May 24, 1944, Serial No. 537,201

5 Claims. (Cl. 260—397.4)

This invention relates to the preparation of certain hormone intermediates, and this application is a division of my copending application, Serial No. 400,559, filed June 30, 1941, now Patent No. 2,352,648, issued July 4, 1944.

In my copending application, Serial No. 393,-667, filed May 15, 1941, now Patent No. 2,352,852, issued July 4, 1944, it is shown that steroidal sapogenins can be converted into a new class of compounds which I designate as pseudo-sapogenins including pseudo-sapogenin exo-acylates.

In my copending application, Serial No. 382,-451, filed March 8, 1941, now Patent No. 2,352,850, issued July 4, 1944, it is shown that diosgenin may be converted into pseudo-diosgenin diacetate.

In the copending application of Marker, Crooks & Wittle, Serial No. 393,666, filed May 15, 1941, now Patent No. 2,352,851, issued July 4, 1944, there is described the oxidation of pseudo-sapogenin exo-acylates to give a new class of esters designated 20-keto-16-(δ-acyloxy-isocaprooxy)-pregnane compounds represented by the partial formula

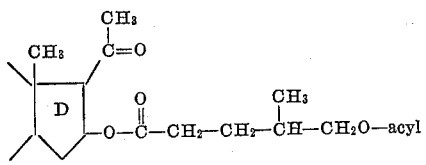

In my Patent No. 2,352,648, I have described and claimed a process comprising the reduction by non-hydrolytic reagents of a 20-keto-16-(δ-acyloxy-isocaprooxy)-pregnane compounds and subsequent treatment with a hydrolytic agent to obtain a 20(β), 16-dihydroxypregnane compound.

According to the invention in this divisional application, instead of using non-hydrolytic reducing agents, I employ reducing agents which also have a hydrolytic action thereby completely removing the group at $C_{16}$.

Thus, reduction of a 20-keto-16-(δ-acyloxy-isocaprooxy)-pregnane compound with the combination of an alkali metal and an alcohol or other substance containing reactive hydrogen, for example, the combination of sodium metal and ethyl alcohol, leads to the formation of a 20(α)-hydroxypregnane compound which may be represented by the following partial formula,

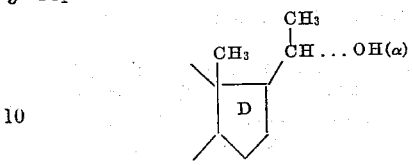

Where the term 20-(α)-hydroxy occurs in this specification, it will be understood that this term refers to one of the two epimers theoretically possible. See further R. E. Marker et al., J. Am. Chem. Soc., 59, 2291 (1937).

My invention may be illustrated by the following examples.

(a) Diosgenin is treated as set forth more fully in my copending Patent No. 2,352,850 for six to fifteen hours with acetic anhydride at 200° C., thereby forming pseudo-diosgenin diacetate. After crystallization from methanol, the pseudo-diosgenin diacetate has a melting point of 97–100° C.

(b) Pseudo-diosgenin diacetate is oxidized with chromic anhydride in acetic acid at 28° C., as set forth more fully in the copending Patent No. 2,352,851. Thus there is obtained the corresponding 20-keto-16-(δ-acyloxy-isocaprooxy)-pregnane compound of melting point 85–86° C. This compound is believed to have the structure,

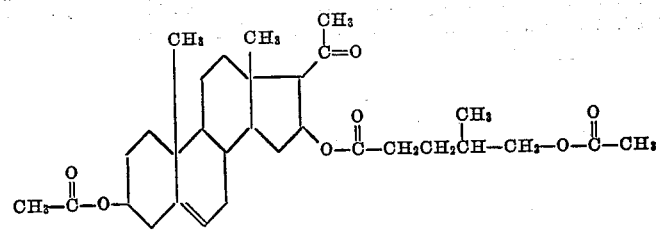

and it may be designated as Δ⁵-pregnenediol-3(β),16-one-20 3-acetate-16-(δ-acetoxy)-isocaproate.

(c) To 2 g. of the product, melting point 85–86° C., designated as Δ⁵-pregnenediol-3-(β),16-one-20 3-acetate-16-(δ-acetoxy)-isocaproate, in 200 cc. of dry isopropyl alcohol is added 15 g. of sodium in small pieces. The mixture is refluxed for about an hour or until all the sodium has been dissolved. Thereupon water is added and the mixture extracted well with ether. The ethereal layer is washed with water and then the ether is removed on a steam bath. The residue is crystallized from dilute acetone and from dilute methanol and thus yields Δ⁵-pregnenediol-3-(β),20-(α) of melting point 171–176° C.

The structure of the above product is shown by the fact that it may be hydrogenated in the presence of glacial acetic acid and a platinum oxide catalyst to yield allo-pregnanediol-3-(β),20-(α) of melting point 214–216° C.

The above examples are intended to illustrate but not to limit the scope of my invention. Other modes of employing my process apparent to those skilled in the art after this disclosure, are intended to fall within the scope of my invention and accordingly I wish to limit the scope of my invention only as indicated in the appended claims.

What I claim as my invention is:

1. Process for preparing hydroxy-pregnane derivatives which comprise subjecting a steroid having in ring D the structure

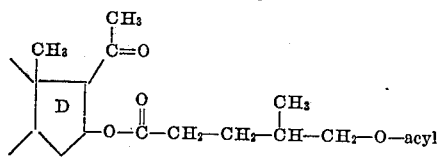

to the action of an alkali metal in combination with an alcohol reactive with said alkali metal to form nascent hydrogen, thereby producing a steroid having in ring D the structure

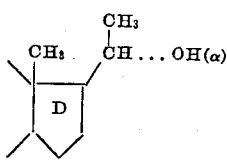

2. Process for preparing hydroxy-pregnane derivatives which comprises subjecting a steroid of the formula

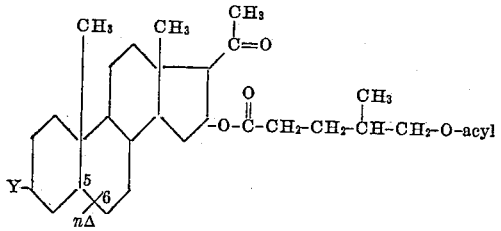

where $n\Delta$ represents n carbon-to-carbon double bonds between C₅ and C₆, n having one of the values 0 and 1, and Y is a member of the class consisting of hydroxyl and groups hydrolyzable to hydroxyl, to the action of an alkali metal in combination with an alcohol reactive with said alkali metal to form nascent hydrogen, thereby producing a steroid of the formula

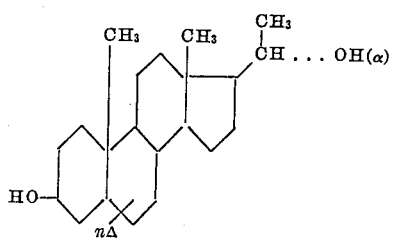

3. Process for preparing hydroxy-pregnane derivatives which comprises subjecting a steroid of the formula

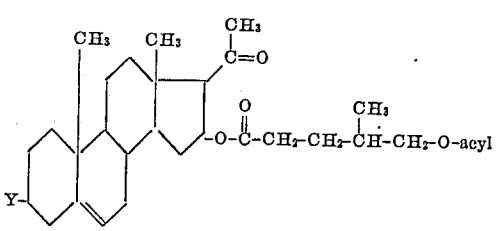

where Y is a member of the class consisting of hydroxyl and groups hydrolyzable to hydroxyl, to the action of an alkali metal in combination with an alcohol reactive with said alkali metal to form nascent hydrogen, thereby producing a steroid of the formula

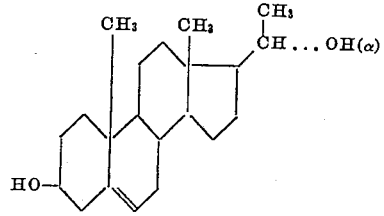

4. Process for preparing Δ⁵-pregnenediol-3-(β),20-(α) which comprises subjecting Δ⁵-pregnenediol-3-(β),16-one-20 3-acetate-16-(δ-acetoxy)-isocaproate to the action of a alkali metal in combination with an alcohol reactive with said alkali metal to form nascent hydrogen.

5. Process for preparing Δ⁵-pregnenediol-3-(β),20-(α) which comprises subjecting Δ⁵-pregnenediol-3-(β),16-one-20 3-acetate-16-(δ-acetoxy)-isocaproate to the action of sodium and isopropyl alcohol.

RUSSELL EARL MARKER.